United States Patent Office 3,136,788
Patented June 9, 1964

3,136,788
GLYCIDYL GLYCIDATE AND THE PREPARATION OF EPOXYALKYL ESTERS OF EPOXYALKANOIC ACIDS FROM EPOXYALKANALS
George B. Payne, Berkeley, and Paul H. Williams, Orinda, Calif., assignors to Shell Oil Company, New York, N.Y., a corporation of Delaware
No Drawing. Filed July 17, 1961, Ser. No. 124,392
8 Claims. (Cl. 260—348)

This invention relates to novel epoxyalkyl esters of epoxyalkanoic acids. More particularly, the invention relates to alpha,beta-epoxyalkyl esters of alpha,beta-epoxyalkanoic acids and to their preparation from alpha,beta-epoxyalkanals.

Esters having at least one vic-epoxy group have been found to be useful as stabilizers for vinyl resins, as reactive diluents in epoxy resin systems, and for similar uses in the resin art. It is an object of the present invention to provide a new class of esters having an epoxy group on each of the ester and acid moieties. Another object of the invention is the provision of novel glycidyl glycidate, useful as a reactive diluent. A further object is the provision of a process for preparing such esters from epoxyaldehydes. A process for preparing glycidyl glycidate from glycidaldehyde is another object of the invention. Other objects will be apparent from the following detailed description of the invention.

These objects are accomplished in the invention by novel alpha-beta-vic-epoxy esters of vic-epoxy carboxylic acids. By vic-epoxy is meant the oxirane ring

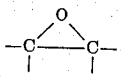

wherein the oxygen atom is connected to each of two adjacent carbon atoms in a chain. Typical alpha,beta-vic-epoxy esters of alpha,beta-vic-epoxy carboxylic acids are the alpha,beta-vic-epoxyalkyl alpha,beta-vic-epoxyalkyl alkanoates. These compounds may be represented by the structural formula

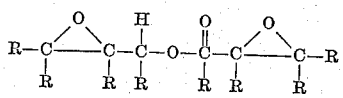

wherein each R is selected from the group consisting of hydrogen and alkyl radicals, preferably having no more than six carbon atoms. Particularly preferred are esters wherein the ester moiety and the acid moiety each have from three to eight carbon atoms.

By virtue of the method by which they are prepared, the preferred esters of the invention will in general have the same number of carbon atoms in the ester moiety as in the acid moiety. Representative of such esters are 2,3-epoxybutyl 2,3-epoxybutyrate; 2,3-epoxyamyl 2,3-epoxyvalerate; 2,3-epoxyhexyl 2,3-epoxycaproate; 2,3-epoxyheptyl 2,3-epoxyheptanoate; and 2,3-epoxyoctyl 2,3-epoxycaprylate, as well as 2,3-epoxyisobutyl 2,3-epoxyisobutyrate. Most preferred ester of the esters of the invention because of its terminal epoxy group is glycidyl glycidate. Other esters which may be prepared by the method of the invention include 3,4-epoxybutyl 3,4-epoxybutyrate; 3,4-epoxypentyl 3,4-epoxyvalerate; 4,5-epoxypentyl 4,5-epoxyvalerate; 5,6-epoxyhexyl 5,6-epoxycaproate, and the like.

The novel esters of the invention are prepared by reacting a vic-epoxyaldehyde in liquid phase in an inert organic solvent in the presence of a catalytic amount of a compound selected from alkali metal hydrides, aluminum alkoxides, and Grignard reagents. By vic-epoxyaldehyde is meant a compound having an oxirane or

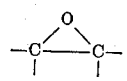

group. Preferred aldehyde compounds are those made up of carbon, hydrogen and oxygen, and having the epoxy group and the formyl group as the sole functional groups. Exemplary aldehydes are the epoxyalkanals wherein the epoxy group is disposed on the alkane chain, and the alkane chain has up to 8 carbon atoms, e.g., 3,4-diepoxybutanal; 3,4-epoxypentanal; 4,5-epoxypentanal; 5,6-epoxyhexanal; 3,4-epoxyhexanal; and 7,8-epoxyoctanal. These epoxyalkanals have in general the structure

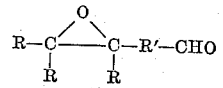

where each R has the above meaning and R' is alkylene or alkylidene, e.g., methylene, propylidene, or the like.

Most preferred class of such epoxyaldehydes are the alpha,beta-vic-epoxyalkanals having the structural formula

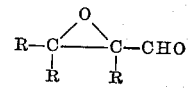

where R is selected from the group consisting of alkyl, preferably of up to six carbon atoms, and the hydrogen atom. Typical compounds of this type are 2,3-epoxybutyraldehyde; 2,3-epoxyisobutyraldehyde; 2,3-epoxyvaleraldehyde; 2,3-epoxycaproaldehyde and 2,3-epoxyheptaldehyde. Also operative are the 2,3-epoxycycloalkyl aldehydes, particularly 2,3-epoxycyclopentanal and 2,3-epoxycyclohexanal.

The aldehyde is reacted in liquid phase in an inert organic solvent in the presence of a catalytic amount of a compound selected from the group consisting of alkali metal hydrides, aluminum alkoxides and the Grignard reagent. Suitable organic solvents are those liquids wherein the epoxyaldehyde is soluble but with which it does not react. Examples of such solvents are such hydrocarbons as the aromatics, e.g., benzene, toluene, and the xylenes; the paraffins, such as pentane, hexane, octane and the like; the haloparaffins, such as chloroform, carbon tetrachloride, ethylene dichloride, trichloroethane and the like; and ethers, including diethyl ether and dioxane. Since the catalysts employed tend to be inactivated by the presence in the reaction system of more than a trace of water, the use of a substantially anhydrous liquid medium, i.e., containing less than about 1% w. of water, is preferred. Since in concentrated reaction systems there is noticeable production of high molecular weight by-products, it is preferred that the solvent be employed in molar excess, that is, with more than about one mole, and preferably from about two to twenty moles, of solvent per mole of epoxyaldehyde.

The catalysts employed are selected from the group consisting of alkali metal hydrides, aluminum alkoxides and Grignard reagents. By alkali metal hydrides are meant those hydrides having the structure MH where M is the cation of an alkali metal. Preferred hydrides are sodium hydride and potassium hydride, both of which are somewhat more reactive under the conditions of the reaction than lithium hydride.

That the alkali metal hydrides are effective catalysts for the ester-forming reaction of epoxyaldehydes is surprising. Under similar conditions, no yield of ester is obtained when saturated aliphatic aldehydes, such as propionaldehyde, are treated with sodium hydride. In view of the known tendency of the alkali metal borohydrides to reduce epoxyaldehydes to epoxy alcohols, it would be expected that the metal hydrides would bring about a corresponding reduction.

Of the alkoxides, the preferred compounds are those having less than four carbon atoms, e.g., aluminum ethoxide, aluminum propoxide and aluminum butoxide, and of these lower alkoxides the most reactive and therefore the most preferred is aluminum isopropoxide. The Grignard reagent is that hydrocarbon magnesium halide compound having the formula R'MgX where R' is hydrocarbon, preferably alkyl of up to four carbon atoms, and X is halogen, e.g., chlorine, bromine or iodine. Representative Grignard reagents which are catalytically active in the process of the invention are the aryl magnesium halides, e.g., phenyl magnesium bromide; and the alkyl magnesium halides, e.g., ethyl magnesium iodide, propyl magnesium chloride, and methyl magnesium bromide.

Only a catalytic amount of any of the types of compounds noted is required to bring about the reaction described. Amounts of catalyst below about 15% w., based on the epoxyaldehyde, are sufficient, and in general amounts of catalyst on the order of about 0.1% w. to about 5% on the same basis are sufficient. The catalyst may be soluble, as in the case of the aluminum alkoxides, or insoluble, as in the case of the metal hydrides.

It has been found that where the epoxyaldehyde dismutation reaction of the invention is impractically slow the rate may be materially increased by including in the reaction system an amount of miscible alcohol equivalent to that of the catalyst. For example, although the sodium hydride-catalyzed reaction of alpha-methyl-alpha-beta-epoxypropanal to yield alpha-methyl-alpha,beta-epoxypropyl alpha-methyl-alpha,beta-epoxpropionate is very slow, good ester yields were obtained after 16 hours when a catalytic amount of butanol, glycidol or benzyl alcohol were included in the reaction system. Suitable alcohols are those having the structure R"OH, where R" is a hydrocarbyl or epoxyhydrocarbyl radical, and which are miscible with the reaction system. Exemplary hydroxy compounds include the alkanols, e.g., ethanol, propanol, butanol, pentanol and preferably those having up to 8 carbon atoms.

It is an important feature of the invention that the reaction may be conducted at comparatively low temperatures. While temperatures from about 0° C. to reflux temperatures may be employed, excellent results are obtained when conducting the reaction at or near room temperature, i.e., between about 20° C. and about 50° C., temperatures between about 20° C. and 35° C. being most preferred. The reaction described may be carried out in batch, semi-continuous, or continuous fashion, and at, above or below atmospheric pressure. Preferably, however, the epoxy esters of the invention are prepared by conducting the reaction as set forth above and at atmospheric pressure.

The conversion of the epoxyaldehyde under the conditions described is mildly exothermic, and the progress of the reaction may be conveniently followed by measuring the temperature of the system. The product epoxy ester may be separated from the reaction system during the reaction, or after its termination by conventional methods, e.g., distillation, preferably under reduced pressure; extraction; crystallization, or the like. The recovered products are generally clear high-boiling liquids at room temperature, and as such are particularly useful as reactive viscosity-reducing diluents in systems of liquid epoxy resins, with which they are readily compatible.

The two alpha,beta-epoxy groups of the epoxy esters of the invention are surprisingly reactive, either as homopolymers or when copolymerized with other epoxy-containing materials. They may therefore be converted into valuable resinous solid products. Materials that may be copolymerized with the claimed polyepoxides include, among others, ethylene oxide, propylene oxide, isobutylene epoxide, epichlorohydrin, vinyl cyclohexane dioxide, butadiene mono- or dioxide, epoxidized tri- and diglycerides, epoxy-ethers, such as diglycidyl ether and glycidyl ethers of polyhydric phenols obtained by reacting a polyhydric phenol, such as bisphenol, with an excess of a halogen-containing epoxide, such as epichlorohydrin, in an alkaline medium, polyepoxy polyethers obtained by reacting, preferably in the presence of an acid-acting compound, such as hydrofluoric acid, a halogen-containing epoxide, such as epichlorohydrin, with a polyhydric alcohol, such as glycerol, ethylene glycol, hexanetriol, sorbitol, mannitol, penetaerythritol, polyglycerol, and the like, and subsequently treating the resulting product with an alkaline component to replace the epoxy group, and other polyepoxide esters, such as di(2,3-epoxypropyl) phthalate, di(2,3-epoxypropyl)adipate, and the like. The glycidyl polyethers of polyhydric phenols obtained by condensing polyhydric phenols with epichlorohydrin are also referred to as "ethoxyline" resins. Representative curable polyepoxides, such as polyethers, are described in the patent to Newey, U.S. 2,965,610, issued December 20, 1960. Typical of such polyethers is the diglycidyl ether of 2,2-bis(p-hydroxyphenyl)propane. Thus, an exemplary solid composition would be the product obtained by curing a mixture of this diglycidyl ether and glycidyl glycidate.

The polymerization of the novel epoxy-substituted esters is preferably accomplished by heating the materials in the presence of a catalyst, such as an amine as triethylamine, ethylenediamine, 2,4,6-(trimethylaminomethyl)-phenol, melamine, and the like, or in the presence of carboxylic acids, their anhydrides, amides or boron trifluoride catalysts. Suitable amines are the alkylamines, including ethylenediamine, diethylene triamine, triethylene tetramine, diethylamine and benzyl dimethylamine; piperidine; pyridine; metaphenylene diamine; and the like. Representative acids include oxalic acid; phthalic acid; maleic acid; hexahydrophthalic acid; pyromellitic acid and the like; and anhydrides are represented by the anhydrides of such acids. Amides include the reaction products of the noted acids and amines. Temperatures used for the polymerization generally vary from about 40° C. to about 100° C.

In copolymer compositions, amounts of the alpha,beta-epoxy esters of the invention from about 1% w. up to about 99% w., based on the total composition, are usefully employed. As will be seen from the above description, the alpha,beta-epoxy esters described are capable of forming solid resinous polymeric compositions with any polyepoxide compound which is itself curable with the aid of heat or such amine, acid, anhydride or trifluoride catalysts. Diluents, fillers and resinous modifiers may also be included in such resinous compositions.

The novel products and processes of the invention are further illustrated by the following specific examples. It should be understood, however, that these examples are merely illustrative, and are not to be regarded as limitations to the appended claims. The basic teachings of the examples may be varied at will within the scope of the disclosure, as will be understood by one skilled in the art. In the examples, the proportions are expressed in parts by weight unless otherwise noted.

EXAMPLE I

A dry solution of 72 g. (1.0 mole) of glycidaldehyde in 150 ml. of carbon tetrachloride was treated with a solution of 0.03 mole of aluminum isopropoxide in 25 ml. of benzene. The mildly exothermic reaction was moderated by periodic cooling to maintain a maximum temperature of 35° C. After two hours, no further cooling was necessary and another portion of catalyst was added. The mixture warmed by itself again for 15 minutes and was then no longer exothermic. After one hour longer there was added a solution of 12 g. of tartaric acid in 85 ml. of water. After shaking, about 200 ml. of ether was added and shaking was continued for a short time. The ether layer, after drying over magnesium sulfate, was concentrated on the steam bath to a low volume. Claisen distillation of the residue afforded 5.1 g. of precut, bp 30–65° C. (<1 mm.) and 10.0 g. (14% yield based on glycidaldehyde) of product, bp 65° C. (<1 mm.); $n_D^{20}$ 1.4541. Bottoms amounted to 8 g.

The product obtained in this manner was analyzed and the following data obtained:

| | Percent w. | | Epoxide value, eq./100 g. | Ester value, eq./100 g. |
|---|---|---|---|---|
| | C | H | | |
| Calculated for $C_6H_8O_4$ | 50.0 | 5.6 | 1.38 | 0.70 |
| Found | 49.6 | 50.8 | 1.23 | 0.74 |

The product was thus identified as glycidyl glycidate.

EXAMPLE II

A mixture of 8 moles (576 g.) of glycidaldehyde in 1600 ml. of benzene containing 8 g. of 50% w. sodium hydride dispersion in mineral oil was stirred for about 16 hours at about 25° C. At the end of that time, the mixture was filtered, washed with 200 ml. of half-saturated aqueous ammonium sulfate solution, dried, and concentrated under reduced pressure to constant weight. In this way, 526 g. of glycidyl glycidate (91% yield) was obtained. The product had an epoxide value of 1.29 eq./100 g., comparing favorably with the theoretical value of 1.38.

Lower yields of glycidyl glycidate were obtained when lithium hydride catalyst was used.

EXAMPLE III

To 0.25 g. of a 50.9% w. sodium hydride-mineral oil suspension in 75 ml. of benzene was added 17.1 g. (0.133 mole) of 3,4-epoxytetrahydropyran-3-carboxaldehyde and 0.30 ml. of glycidol. The mildly exothermic reaction was cooled with tap water and stirred for about 16 hours.

At the end of that time, 0.4 ml. of acetic acid and 75 ml. of benzene were added, the mixture was washed with 2 volumes of half-saturated aqueous ammonium sulfate, and the precipitated product filtered. The filtrate was stripped of solvent at 110° C. and ~1 mm. Hg, leaving a residue of a 10.6 g. of viscous orange liquid, apparently a mixture of isomers. The solids from the filtration were washed with water to remove organic salts and then collected and dried.

In this way, a total yield of 80% of product was obtained. Analysis of the products gave the following data:

| | C | H | Epoxide, eq./100 g. | M.P., °C. |
|---|---|---|---|---|
| Calculated for $C_{12}H_{16}O_6$ | 56.2 | 6.3 | 0.780 | |
| Orange liquid | 56.5 | 6.4 | | |
| Filtered solids | 56.1 | 6.3 | 0.752 | 109.5–110 |

From these data, it was concluded that the product was 3′,4′ - epoxytetrahydropyranyl - 3,4 - epoxytetrahydropyran-3-carboxylate.

EXAMPLE IV

To 100 ml. of dry benzene were added 5 ml. of a diethyl ether solution containing 0.015 eq. methyl magnesium bromide and, dropwise, 36 g. (0.50 mole) glycidaldehyde. The mixture was stirred at about 20° C. for an hour and then allowed to stand for about 16 hours at that temperature. The product was then worked up as in the previous experiments to yield 7.8 g. (31% yield) of glycidyl glycidate.

EXAMPLE V

To a 500 ml. vessel was charged 0.5 g. of a 50.9% w. mineral oil suspension of sodium hydride, 100 ml. benzene, 43 g. alpha-methyl glycidaldehyde, and 0.5 ml. of glycidol in 2 ml. benzene. The mixture was stirred for about 18 hours at 20–25° C. and then worked up as in the previous experiments. In this way was obtained an 87% yield of alpha-methyl glycidyl alpha-methyl glycidate, B.P. 82–83° C. (<1 mm.).

| | C | H | Epoxide, eq./100 g. |
|---|---|---|---|
| Calculated for $C_8H_{12}O_4$ | 55.8 | 7.0 | 1.15 |
| Found | 56.1 | 7.0 | 1.16 |

EXAMPLE VI

As in the previous experiments, 36 g. of glycidaldehyde was reacted in 100 ml. benzene in the presence of 0.5 g. of the 50.9% w. NaH-mineral oil suspension of 0.90 ml. butanol at 20–25° C. for about 20 hours. A 53% yield of glycidyl glycidate was obtained.

EXAMPLE VII

To a vessel was charged 100 ml. benzene, 38 g. of 2,3-epoxy-2-methylbutyraldehyde and 1.0 g. of the 50.9% NaH-mineral oil suspension. The mixture was stirred for an hour at about 25° C. and treated with another 1.0 g. sample of catalyst. It was finally allowed to stand for about 16 hours.

Work-up gave 22 g. (58% yield) of 2,3-epoxy-2-methyl-butyl 2,3-epoxy-2-methylbutyrate, B.P. 68–70° C. (0.1 mm.). Analysis gave the following data:

| | C | H |
|---|---|---|
| Calculated for $C_{10}H_{16}O_4$ | 60.0 | 8.1 |
| Found | 60.4 | 8.1 |

EXAMPLE VIII

To a vessel was charged 1.50 g. of the 50.9% sodium hydride-mineral oil dispersion, 100 ml. benzene, and 36 g. glycidaldehyde. The mixture was stirred for five hours at 20° C. to yield 32.5 g. (80% yield) of glycidyl glycidate.

EXAMPLE IX

A series of compositions of glycidyl glycidate mixed with the diglycidyl ether of 2,2-bis(p-hydroxyphenyl)propane was prepared. The viscosity at 25° C. of each of the mixtures is set forth in the following table:

Percent ester: Viscosity at 25° C., poises
5 ---------------------------------------- 79
10 --------------------------------------- 37
15 --------------------------------------- 17
20 --------------------------------------- 8
25 --------------------------------------- 6

It will be seen from these data that a relatively small amount of glycidyl glycidate effectively reduces the viscosity of epoxy resins with which it is mixed.

EXAMPLE X

Tht heat distortion values of a series of cured epoxy resin compositions were compared. About 15 phr. of each curing agent was employed. Resins employed are shown in the following table.

*Heat Distortion Temperatures*

| Resin, method of cure | 80% diglycidyl ether of 2,2-bis(p-hydroxy phenyl) propane, 20% glycidyl glycidate | 38% diepoxide of dicyclopentenyl ether, 62% diglycidyl ether of 2,2-bis(p-hydroxyphenyl) propane | 89% diglycidyl ether of 2,2-bis(p-hydroxy phenyl) propane, 11% butyl glycidyl ether |
|---|---|---|---|
| Diethylene triamine, 4 hr. at 150° C | 99 | 103 | 74 |
| m-Phenylene diamine, 4 hr. at 150° C | 154 | 128 | 101 |
| m-Phenylene diamine, 20 hr. at 150° C | 158 | 154.5 | 105 |

The cured castings containing the glycidyl glycidate were hard tough infusible solids showing superior resistance to heat distortion.

We claim as our invention:
1. Glycidyl glycidate.
2. The process of preparing the vic-epoxyalkyl ester of vic-epoxyalkanoic acid comprising reacting a vic-epoxyalkanal of up to 9 carbon atoms and consisting of a hydrocarbon alkyl radical having a formyl radical and a vic-epoxy ring as its sole functional groups, in the presence of a catalyst selected from the group consisting of alkali metal hydrides, aluminum alkoxides wherein each alkoxide radical has up to 3 carbon atoms, and Grignard reagents.
3. The process of claim 2 wherein the vic-epoxyaldehyde is an alpha,beta-vic-epoxyaldehyde.
4. The process of preparing glycidyl glycidate comprising reacting glycidaldehyde in an inert organic solvent at a temperature from about 0° C. to below about 100° C. and in the presence of a catalytic amount of alkali metal hydride.
5. The process of preparing glycidyl glycidate comprising reacting glycidaldehyde in an inert organic solvent and in the presence of a catalytic amount of aluminum isopropoxide.
6. The process of preparing the alpha,beta-vic-epoxyalkyl ester of alpha,beta-vic-epoxyalkanoic acid comprising reacting an alpha,beta-vic-epoxyaldehyde free from alpha-hydrogen substitution of up to 9 carbon atoms and consisting of a saturated hydrocarbon radical having a formyl radical and a vic-epoxy ring as its sole functional groups, in an inert organic solvent in the presence of an alcohol selected from the group consisting of benzyl alcohol and glycidol and in the presence of a catalytic amount of alkali metal hydride.
7. The process of preparing the vic-epoxyalkyl ester of vic-epoxyalkanoic acid comprising reacting a vic-epoxyalkanal of up to 9 carbon atoms and consisting of a hydrocarbon alkyl radical having as its sole functional groups a formyl radical and a vic-epoxy ring, in an inert liquid aromatic hydrocarbon solvent, in the presence of a catalytic amount of alkali metal hydride.
8. The process of preparing glycidyl glycidate comprising reacting glycidaldehyde in benzene in the presence of a catalytic amount of sodium hydride.

References Cited in the file of this patent
UNITED STATES PATENTS

| | | |
|---|---|---|
| 2,698,339 | Hawkins et al. | Dec. 28, 1954 |
| 2,870,166 | Kubler | Jan. 20, 1959 |
| 2,949,473 | Dazzi | Aug. 16, 1960 |
| 2,969,377 | Phillips et al. | Jan. 24, 1961 |
| 2,991,306 | Youngman et al. | July 4, 1961 |
| 2,998,447 | Finch et al. | Aug. 29, 1961 |
| 3,074,973 | Phillips et al. | Jan. 22, 1963 |